United States Patent Office 3,494,100
Patented Feb. 10, 1970

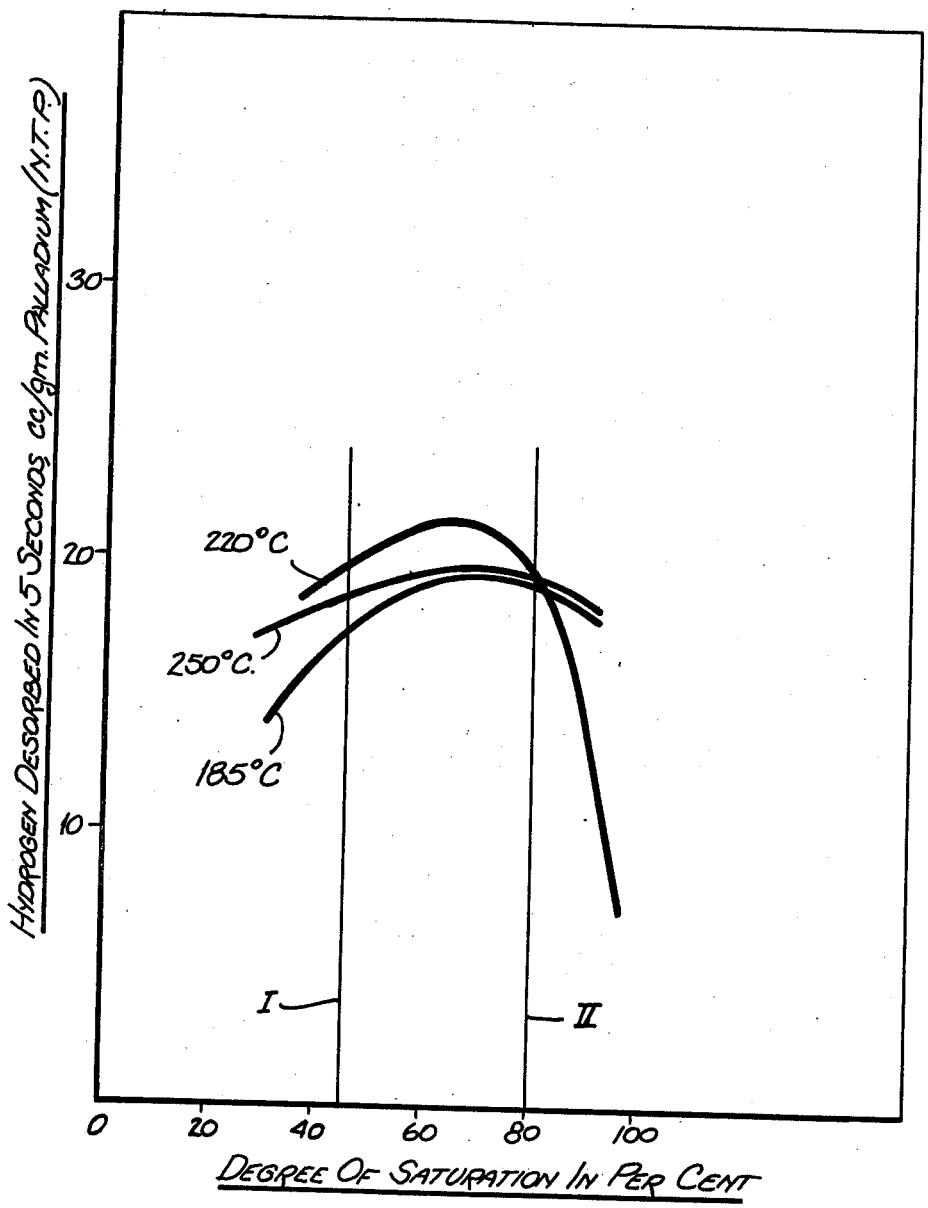

3,494,100
PURIFICATION OF HYDROGEN-CONTAINING GASES
James Hope, Ickenham, England, assignor to The International Nickel Company, Inc., New York, N.Y., a corporation of Delaware
Filed May 9, 1968, Ser. No. 727,902
Claims priority, application Great Britain, May 17, 1967, 22,875/67
Int. Cl. B01d 53/04, 53/02
U.S. Cl. 55—16       17 Claims

ABSTRACT OF THE DISCLOSURE

Hydrogen separation process comprising absorption and desorption of hydrogen into and from palladium achieves a high rate of hydrogen output through special control of absorption-desorption cycle.

---

The present invention relates to separation of hydrogen from mixtures of hydrogen and other gases and more particularly to processes employing palladium-containing materials for purifying hydrogen-containing gases.

Heretofore the art has endeavored to achieve rapid and efficient separation of hydrogen from gaseous mixtures by various processes which utilize certain special characteristics of permeability and/or solubility which palladium possesses in respect to hydrogen. For instance, it is known that palladium is selectively permeable to hydrogen and thus a palladium film, which may be in the form of a diaphragm or tube and may be of commercially pure palladium or a palladium-rich alloy, e.g., an alloy containing about 25% silver and balance palladium, can be employed as a selectively permeable barrier that permits hydrogen to diffuse therethrough while holding back the other gases in a hydrogen-containing gaseous mixture. However, it has been undesirably expensive and difficult to provide and maintain palladium barriers of the high quality required for such diffusion separation processes.

It has also been proposed to utilize the capability of palladium to selectively absorb (or dissolve) hydrogen, whereby palladium absorbs very substantial quantities of hydrogen but little or no other gas from a gaseous mixture, with processes wherein hydrogen is alternately absorbed into and desorbed from a palladium-containing material by varying the pressure and/or the temperature of the gas and/or the palladium. For instance, U.K. patent specification No. 1,090,479 describes a single-chamber process wherein a gaseous mixture from which hydrogen is to be separated is brought into contact with palladium particles in a container under such conditions of temperature and pressure that hydrogen is absorbed by the palladium, the unabsorbed gases are then discharged from the container and thereafter the container is put into communication with a receiver at relatively low pressure so that the hydrogen is desorbed into the receiver. It has also been proposed that a single-chamber separation process such as that claimed in U.K. patent specification No. 1,090,479 be carried out with the palladium powder in a fluid bed in the absorption-desorption chamber wherein palladium powder is fluidized by the hydrogen-containing gaseous mixture at a relatively high pressure, e.g., 500 p.s.i.g. (pounds per square inch gage), during the absorption step and is fluidized by hydrogen at lower pressures, e.g., 300 p.s.i.g. to 5 p.s.i.g., during the desorption step, for instance as set forth in the provisional and/or the complete specifications, filed Mar. 15, 1967 and Mar. 15, 1968, respectively, in U.K. patent application No. 12,230/67. For example, it has been proposed to recover hydrogen from cracked ammonia using a single-chamber fluid bed process wherein hydrogen is absorbed into fluidized palladium powder for 8 seconds with a gas flow of 10 cubic meters per hour at 500 p.s.i.g. pressure and thereafter the fluid bed chamber is purged for 2.5 seconds and then the hydrogen is desorbed in the same chamber for 7.5 seconds at a low pressure near atmospheric. Such single chamber fluid bed processes may be of 10 to 30 seconds duration. For single-chamber processes, which are usually carried out substantially isothermally at a controlled elevated temperature, it has also been proposed that during the desorption step additional heat be provided to the chamber, e.g., with heaters around a fluid bed chamber, inasmuch as the desorption step is endothermic.

For processes wherein the palladium is held statically in a chamber during absorption and desorption it has been proposed that the palladium be in the form of compacted powder and/or sponge having a density of about 2.5 grams per cubic centimeter or greater. It has also been proposed that alloyed palladium or inert particles having a palladium-rich coating be employed in absorption-desorption processes for separating hydrogen.

Furthermore, it has additionally been proposed to separate hydrogen in apparatus having two zones, e.g., chambers, that differ in temperature and/or pressure and by absorbing hydrogen into palladium in one zone and thereafter desorbing the hydrogen in the second zone, with the palladium being moved from the absorption zone to the desorption zone and with the temperature and pressure conditions in the two zones being controlled so that the solubility of hydrogen in the palladium is greater under the conditions in the absorption zone than under the conditions in the desorption zone.

Although absorption-desorption processes for separating hydrogen with palladium can be either isothermal pressure-variant processes or isobaric temperature-variant processes or can be performed with variation of both temperature and pressure, it is generally more practical to cycle the pressure in single-chamber processes. Whether pressure cycling or temperature cycling, or both, are employed and whether the process is of single-chamber or a double-chamber nature, it is important to obtain a high rate of hydrogen output per unit weight of palladium employed. While proposals heretofore have outlined means for separating hydrogen with use of palladium as an absorbent-desorbent agent, difficulties in obtaining a high rate of hydrogen output per unit weight of palladium have remained as obstcales to achieving fully satisfactory commercial success with previously known methods. In view thereof, the present invention is directed to obtaining more efficient utilization of palladium as an absorbent-desorbent agent for separating hydrogen.

Although attempts were made to overcome the foregoing difficulties and disadvantages, none, as far as I am aware, was entirely successful from the viewpoint of the needs of commercial practice on an industrial scale.

It has now been discovered that improved high efficiency in separating hydrogen from gaseous mixtures can be achieved through special control of the feed gas mixture and of the absorption-desorption cycles in processes using palladium as a selective absorption-desorption agent for hydrogen.

It is an object of the present invention to provide a process for purifying hydrogen-containing gas mixtures and thus obtaining hydrogen-enriched gaseous products, including substantially pure hydrogen and gas mixtures having a relatively high hydrogen content, from gas mixtures that contain hydrogen.

Other objects and advantages of the invention will become apparent from the following description taken in conjunction with the accompanying drawing which shows a chart on which amounts of hydrogen desorbed from palladium in a fixed time period of 5 seconds are graped in relation to the degree of saturation of the palladium with hydrogen at the start of the desorption period.

Generally speaking, the present invention contemplates process improvements for obtaining improved rates of hydrogen output from hydrogen separation processes of the pressure-variant isothermal kind wherein hydrogen in an atmosphere containing hydrogen mixed with some other gas is selectively absorbed at an elevated pressure through surfaces of, and into, palladium particles at an elevated temperature and is thereafter desorbed at a lower pressure from the same palladium surfaces at substantially the same elevated temperature into an atmosphere that is essentially devoid of any gas other than hydrogen. In accordance with the present invention and in combination with a process of the aforedescribed pressure-variant isothermal kind, the feed gas mixture for the process contains at least about 50% hydrogen, the palladium particles are in the form of compacted particulate palladium, e.g., compacted powder or compacted sponge, characterized by a bulk density of at least about 2.5 grams per cubic centimeter (gm./cc.) and the absorption of hydrogen into the palladium is continued until the palladium is at least 45% saturated with hydrogen and, moreover, the absorption is discontinued before the palladium is more than 80% saturated with hydrogen. Desorption of hydrogen in the improved process of the invention is commenced very shortly after absorption is discontinued and thus desorption is generally initiated with the palladium in a condition that is at least about 45% but not more than 80% sauraed with hydrogen. Separation of hydrogen in accordance with the invention enables achieving improved rates of output which are of the order of about 1.6 cubic centimeters of hydrogen per gram of palladium per second (cc.$H_2$/gm.-Pd/sec.) and higher, e.g., 1.94 cc.-$H_2$/gm.-Pd/sec.

In view of the foregoing and in connection with further description of the invention hereinafter it is to be understood that the invention contemplates an isothermal elevaed temperature process for separating (or purifying) hydrogen comprising providing a gas mixture containing at least about 50% hydrogen, contacting particulate palladium having a bulk density of at least about 2.5 gm./cc. with said gas mixture at an elevated pressure to thereby selectively absorb hydrogen into the palladium until the palladium is 45% to 80% saturated with hydrogen, and thereafter, when the palladium is 45% to 80% saturated with hydrogen, removing gases other than hydrogen away from the palladium and lowering the gas pressure around the palladium to discontinue the absorption of hydrogen and to desorb hydrogen from the palladium into an atmosphere substantially free from gases other than hydrogen. Desorbed hydrogen is then collected for use or, if desired, for further purification.

It has been surprisingly found that the rate of desorption of hydrogen by palladium of bulk density 2.5 gm./cc. or greater decreases as saturation of the palladium with hydrogen is approached. The rate of desorption depends not only on the degree of saturation at the beginning of the desorption but also on the temperature and the rate itself varies as desorption continues.

As an illustration of the way in which the rate of desorption varies with the degree of saturation at the beginning of the desorption, reference is made to the accompanying drawing, which shows graphically (as ordinates) the volumes of hydrogen (in cubic centimeters at N.T.P.) desorbed in 5 seconds per gram of palladium of bulk density 5 gm./cc. plotted against the degree of saturation of the palladium in hydrogen (in percent) at the beginning of the desorption (as abscissae). The three curves shown on the chart in the drawing were obtained with a pressure of absorption of 14.6 atmospheres absolute, and with desorption to atmospheric pressure, at the three different temperatures, namely 185° C., 220° C. and 250° C., indicated. The lines I and II show 45% and 80% saturation respectively. All pressures referred to herein are absolute pressures and gas volumes referred to herein are at normal (or standard) temperature and pressure (N.T.P.) of 0° C. and 760 millimeters of mercury, unless indicated otherwise.

It will be seen that the rate of desorption, though dependent on the temperature, is generally greater in the range of 45% to 80% saturation than outside it and reaches an optimum for each temperature and that this optimum is in the range of 60% to 70% saturation.

It has been further found that it is possible to control the process so that desorption begins when the degree of saturation is within desirable limits and thereby to increase the output of hydrogen in terms of cubic centimeters of hydrogen per gram of palladium per second (cc.-$H_2$/gm.-Pd/sec.) when the process is carried on continuously in repeated cycles of steps of absorption and desorption. It is in fact possible to work close to the optimum degree of saturation and so to obtain excellent outputs.

For any given gas mixture, the variable factors which determine the degree of saturation reached in successive cycles in continuous operation are the temperature, the pressures of absorption and desorption, the ratio of the durations of the desorption and absorption steps in each cycle, and the duration of each cycle.

The invention comprises so correlating these factors in a gas mixture containing 50% or more hydrogen that the palladium is from 45% to 80%, and advantageously from 60% to 70%, saturated with hydrogen at the end of each absorption step. The optimum output per unit time depends upon the composition of the incoming gas mixture, the higher the proportion of hydrogen in the mixture the greater being this optimum output. If the mixture is rich in hydrogen, containing say, at least about 95% hydrogen, or more, and thus is in effect impure hydrogen from which a small amount of impurity must be removed, it is possible to attain an output of hydrogen at least equivalent to 1.6, and with the best correlation to 1.9 or more, cc./gm.-Pd per second of each cycle. If the gas mixture contains a substantial proportion (say, at least 20%) of gas other than hydrogen, e.g., is composed of 75% hydrogen and 25% nitrogen, the optimum output is not so high, but may be 1.6 cc.-$H_2$/gm.-Pd/sec. or more.

In carrying out the invention, the palladium is preferably commercially pure palladium powder or sponge closely filling a container. The temperature can be in the range of 170° C. to 250° C. Temperature may vary slightly throughout each cycle but can easily be held substantially constant by electric heating under thermostatic control. So far as the pressures are concerned, the partial pressure of hydrogen is the determining factor. It is simplest to desorb into a container that is substantially at atmospheric temperature, but this is not essential. The partial pressure of the hydrogen during the absorption should be substantially greater, say 8 atmospheres greater, than that of desorption, and the difference between the two pressures is advantageously higher, say, 15 atmospheres. In general, the greater the partial pressure of the hydrogen during the absorption step, the higher is the output, provided of course that the degree of saturation of the palladium with hydrogen is maintained in the herein required range of 45% to 80%.

In considering the duration of each cycle it is necessary to appreciate that at the end of the absorption step unabsorbed gas is present in the interstices of the mass of palladium and is also present in any vacant space in the container around the palladium. In order for the recovered hydrogen to be as pure as practical, the palladium and whatever container is used around the palladium must be purged of this unabsorbed gas. This can be done in the first part of the desorption step before pure desorbed hydrogen flows into a receiver in the remaining part of the desorption step. The purging requires the same, though only a very short time, e.g., 0.2 second, whatever the overall time of the cycle. The purged gas contains some hydrogen, which is lost. Accordingly, the cycle should not be too short because if it is, the hydrogen lost during purging may become an appreciable fraction of the total hydrogen admitted to the container during the absorption step. On the other hand, if the cycle is too long, the output goes down. It is found that total cycle times of about 5 seconds to about 10 seconds are satisfactory.

For any given total cycle time the most expedient variant to control is the ratio of the time of desorption to that of absorption. Thus, in carrying out the invention the temperature and the pressure can be established initially and a suitable cycle time determined. Then the ratio of the times of desorption and absorption is set to give high output in continuous cycles of operation. This ratio will depend largely upon the temperature, since the higher the temperature the greater is the rate of desorption, so that the ratio of desorption time to absorption time is reduced. Absorption of a given amount of hydrogen is quicker with a hydrogen-rich mixture than with one containing a substantial proportion of gas other than hydrogen, e.g., at most 50% of gas other than hydrogen. Because of this, the desorption step in each cycle is normally longer than the absorption step when the feed gas mixture contains at least about 50% hydrogen. In the case of a mixture of 98% hydrogen and 2% nitrogen, typical satisfactory ratios of desorption time to absorption time are in the range of 4:1 to 3:1 when the process is carried out in the advantageous temperature range 220° C.±10° C.

The output can readily be measured by an appropriate instrument. Thus by observing the instrument reading, or more suitably a continuous graph of it, the operator can detect any change and adjust the condition accordingly. If the output falls, the ratio of desorption time to absorption time can be adjusted until the operator sees that the output is once more what is required.

For obtaining advantageously high rates of hydrogen output, all of the absorbed hydrogen is not desorbed during the desorption step. Advantageously, desorption is discontinued when the level of saturation has dropped down to about 20%. A typical advantageous cyclic process comprises starting with the palladium initially containing little or no hydrogen and then, in sequence, absorbing to 65% saturation, desorbing to 20% saturation, absorbing to 65% saturation, desorbing to 20% saturation and continuing this sequence indefinitely.

Effects of variations in temperature and in the ratio of absorption time to desorption time upon hydrogen output are illustrated hereinafter with the data in Tables I, II and III. The results in Tables II and III were obtained with palladium of the same bulk density of 5 gm./cc. and with the same absorption pressure of 14.6 atmospheres and with desorption to atmospheric pressure as are referred to in connection with the graphs in the drawing, and relate to absorption from a feed gas mixture of 98% hydrogen and 2% nitrogen.

Table I shows the conditions in four continuously cycled processes of 35 cycles each, as follows:

TABLE I

| Process | Temperature (° C.) | Absorption time in seconds | Desorption time in seconds | Ratio, D/A |
|---|---|---|---|---|
| X | 185 | 2 | 8 | 4:1 |
| A | 220 | 2 | 8 | 4:1 |
| B | 220 | 2.5 | 7.5 | 3:1 |
| Y | 220 | 4 | 6 | 1.5:1 |

Ratio, D/A = Ratio of desorption time to absorption time.

Table II shows the hydrogen output throughout the four processes. It is not feasible to determine the degree of saturation without complete desorption and, accordingly, for each process this degree was determined only at the end of 35 cycles. From such graphs as those shown in the drawing it is, however, possible to calculate the degree of saturation from the output.

In each process the palladium was initially substantially free from hydrogen.

It is to be understood that by the term saturation I mean the amount of hydrogen which can be absorbed at the service conditions of the palladium or the palladium alloy viz at any given temperature and pressure above the critical pressure when the time for the absorption step is unlimited.

TABLE II

| Cycle | Hydrogen output, in cc./gm.-Pd per indicated process cycle | | | |
|---|---|---|---|---|
| | Process X | Process A | Process B | Process Y |
| 1st | 18.2 | 14.1 | 15.2 | 14.6 |
| 5th | 18.1 | 17.1 | 16.8 | 19.4 |
| 10th | 16.7 | 17.8 | 18.8 | 18.8 |
| 15th | 16.5 | 18.0 | 19.2 | 18.5 |
| 20th | 15.3 | 18.1 | 19.4 | 18.2 |
| 25th | 14.7 | 18.5 | 19.4 | 17.2 |
| 30th | 14.1 | 18.8 | 19.4 | 15.2 |
| 35th | 12.0 | 19.2 | 19.4 | 14.4 |

At the beginning of the 35th desorption step, and thus at the end of the 35th absorption step, the degree of saturation were as follows:

Process:                 Degree of saturation (percent)
X ---------------------------------------- 90
A ---------------------------------------- 52
B ---------------------------------------- 67
Y ---------------------------------------- 97

TABLE III

Process X was not fully in accordance with the invention. The good output (1.82 cc./gm.-Pd/sec) at the beginning of the first desorption step shows that the palladium was about 70% saturated but at the relatively low temperature of 185° C. the ratio of desorption time to absorption time (4:1) was too low for maintaining the absorption saturation within the required range and thus the output fell and the decreasing trend of the output is indicative of excessively increasing saturation.

With Process A, at the higher temperature of 220° C., the hydrogen output was initially poor (1.41 cc./gm.-Pd/sec.) but soon increased to over 1.7 cc./gm.-Pd/sec. in successive cycles. Process A is an example of the invention, though the output is not as good as it might be and even after 35 cycles had not completely settled to a steady value and was still rising. Calculation shows that in cycles after the 10th cycle the degree of saturation was over 50%, thus showing that good output can be obtained outside the preferred saturation range. It will of course be appreciated, by those skilled in the art, that the first few cycles of a multicycle process may not be representative per se of the process during prolonged operation and often the trend toward or away from desirable stabilized, steady state, conditions is of much more importance.

Process B is an additional and more advantageous example of the invention. The ideal is rapid arrival at a high and constant output and this was achieved in practice with Process B, with which the output was 1.92 cc.-H₂/gm.Pd/sec. after 15 cycles and remained substantially constant. Thus, Process B shows that with proper control of the variables (in this example the adjustment of the desorption/absorption ratio to 3:1 at a temperature of 220° C.) the optimum degree of saturation of about 70% and thus very good output can be obtained with a short stabilization period of only about 10 cycles.

The importance of the desorption/absorption ratio is well illustrated with Process Y, which had a desorption/absorption ratio of 1.5:1. This ratio of 1.5:1 in Process Y was too low for the accompanying conditions of the very rich feed gas containing 98% hydrogen and the process temperature of 220° C. Although a promising output was obtained initially, during continuous operation of Process Y the low D/A ratio led to over 80% saturation (in fact 97%) with a resultant unsatisfactory fall in the output. Thus, Process Y was not satisfactory when in continuous operation and could not provide a satisfactory steady-state output and, of course, is not an example of the invention.

It is to be further noted Table III shows that at the 35th cycle of operation of Processes A and B the degrees of greatest saturation of the palladium with hydrogen were being maintained within the range of 45% to 80% in accordance with the invention whereas at the corresponding points of operation of Processes X and Y the degrees of saturation with Processes X and Y were 90% and 97%, respectively, and were thus too high to be in accordance with the invention.

Process C, which is described next hereinafter, is an example of the invention wherein hydrogen was separated from a feed gas mixture of 75% hydrogen and 25% nitrogen. Referring now to Process C, the palladium used was sponge palladium of bulk density of 5 gm./cc. and weighed 47 grams. The gas mixture was fed to the container of the palladium under a total pressure of 31.5 atmospheres, so that the partial pressure of the hydrogen was 23.6 atmospheres at the beginning of each cycle; the partial pressure fell to 14.0 atmospheres at the end of the absorption step. The desorption pressure was 1.2 atmospheres. The temperature of the container was maintained very close to 220° C. under the thermostatic control. Each cycle of Process C lasted 5 seconds, being composed of 3 seconds absorption and 2 seconds desorption (including purging for 0.2 second). The ratio of desorption to absorption was therefore 2:3 or about 0.66:1. The gas flowed at a rate of 11.7 liters per hour. Hydrogen was desorbed at a rate of 6.3 liters per hour per gram of palladium and the purged gas amounted to 4.8 liters per hour. The desorbed hydrogen was 98.3% pure and constituted 74% of the total hydrogen fed to the container. The hydrogen output was thus 1.75 cc./gm.-Pd/sec. and the approximate degree of saturation was 60%. The foregoing Process C was successfully carried on for 38 hours, that is to say, approximately 27,000 cycles.

Different embodiments of the process can be operated in cascade with the output of one embodiment furnishing the feed gas for a second embodiment of the process of the invention. For example, processes such as the Processes B and C described herein as examples of the invention could be operated in cascade with the C process feeding the B process. Thus, gas containing 75% hydrogen would be fed to the C process and hydrogen would be separated thereby to provide an enriched gas mixture containing at least 98% hydrogen. The enriched gas mixture from the C process would then be fed to the B process and thereby purified to provide an output gas of relatively high purity.

The invention may be carried out in apparatus of the kind diagrammatically illustrated in FIGURE 6 of U.K. patent specification No. 1,090,429, the valves all being operated by an electric timing device, which can easily be set to give any desired desorption/absorption ratio.

While the invention has been described with reference to use of particles of pure palladium as the absorbent/desorbent agent, the invention also contemplates carrying out the subject process with the palladium in an alloy and/or with the palladium in the form of coatings on inert particles, which coatings may be either pure palladium or alloyed palladium. In this connection, it is contemplated that the invention be practiced using the palladium alloys and coated particles disclosed for the invention set forth in the complete specification filed Mar. 6, 1968 in U.K. application No. 10,929/68, e.g., palladium alloys containing at least about 70% palladium and the balance metal from the group consisting of up to 30% silver, up to 30% gold, up to 1% boron, up to 10% copper, up to 10% nickel, up to 10% ruthenium, up to 10% platinum and up to 10% rhodium. When the palladium for the process is alloyed with other metal the percent of saturation is calculated on the basis of the palladium content of the alloy.

The present invention is particularly applicable to recovering hydrogen from hydrogen-containing gas mixtures, e.g., to obtaining at least moderately pure hydrogen from cracked ammonia containing about 75% hydrogen and about 25% nitrogen, and is also applicable to supplying hydrogen-enriched gas mixtures from other gas mixtures containing 50% or more hydrogen. Furthermore, and of special note from the viewpoint of commercial utilization, the output rates of hydrogen that are achieved with the new process set forth herein provide economic benefits of enabling improved efficient use of the palladium absorbent/desorbent material in isothermal pressure-variant processes for separating hydrogen with a palladium-containing absorbent/desorbent agent.

Although the present invention has been described in conjunction with certain advantageous embodiments, it is to be understood that other embodiments, which also may be advantageous, and modifications and variations may be resorted to without departing from the spirit and scope of the invention, as those skilled in the art will readily understand. Such other embodiments, modifications and variations are considered to be within the purview and scope of the invention and appended claims.

I claim:
1. In a continuously cycled, substantially isothermal, pressure-variant process for separating hydrogen from a feed gas mixture of hydrogen and at least one other gas, wherein the cycle in said process comprises selectively absorbing hydrogen from said feed gas mixture at an elevated pressure through surfaces of and into particulate palladium that is maintained at an elevated temperature throughout the process, removing gases other than hydrogen from around the palladium and thereafter desorbing and collecting hydrogen from the palladium under a reduced pressure, the improvement comprising controlling said process to provide that:
 (a) the feed gas mixture contains at least 50% hydrogen;
 (b) the particulate palladium has a density of at least about 2.5 grams per cubic centimeter;
 (c) the degree of saturation of the palladium with hydrogen at the end of absorption in the cycle of the process is maintained within the range of 52% to 70% saturation; and
 (d) desorption is initiated while the palladium is 52% to 70% saturated with hydrogen.

2. A process as set forth in claim 1 wherein the degree of saturation of the palladium with hydrogen at the end of absorption in the cycle of the process is maintained within the range of 60% to 70% saturation and the desorption of hydrogen is initiated while the palladium is 60% to 70% saturated with hydrogen.

3. A process as set forth in claim 1 wherein the feed gas mixture contains at least 95% hydrogen.

4. A process as set forth in claim 1 wherein the temperature of the particulate palladium is maintained in the range of 170° C. to 250° C.

5. A process as set forth in claim 1 wherein the ratio of the time during which hydrogen is desorbed to the time during which hydrogen is absorbed is in the range of about 4:1 to about 0.66:1.

6. A process as set forth in claim 1 wherein the feed gas contains at least 95% hydrogen and wherein the ratio of the time during which hydrogen is desorbed to the time during which hydrogen is absorbed is in the range of about 4:1 to about 3:1.

7. A process as set forth in claim 1 wherein the duration of the cycle is controlled to be from 5 seconds to 10 seconds.

8. A process as set forth in claim 1 wherein the partial pressure of hydrogen in the gas mixture surrounding the palladium during the absorption of hydrogen is at least about 8 atmospheres greater than the partial pressure of hydrogen in the atmosphere surrounding the palladium during the desorption of hydrogen.

9. A process as set forth in claim 1 wherein the particulate palladium is alloyed with at least one other metal.

10. A process as set forth in claim 1 wherein desorption is discontinued when the percentage of saturation has decreased to about 20% and wherein adsorption in the following cycle is initiated while the palladium is about 20% saturated with hydrogen.

11. Aproces s as set forth in claim 1 wherein the particulate palladium is in the form of palladium-containing coatings on inert particles.

12. A continuously cycled process comprising contacting particulate palladium having a bulk density of at least 2.5 grams per cubic centimeter with a gaseous mixture containing at least 50% hydrogen and a minor proportion of a gas other than hydrogen at an elevated pressure in a chamber maintained throughout the process at an elevated temperature, selectively absorbing hydrogen into said particulate palladium, continuing the absorption of hydrogen until the palladium is at least 52% saturated with hydrogen, discontinuing the absorption before the palladium is over 70% saturated with hydrogen, thereafter purging the chamber of gas other than hydrogen and then decreasing the pressure around the palladium while maintaining atmosphere around the palladium substantially devoid of gas other than hydrogen to thereby desorb hydrogen from the palladium, collecting desorbed hydrogen from said chamber and continuously repeating said steps of absorption, purging, desorption and collecting while maintaining the limit of saturation in each absorption step to be within the range of 52% to 70% saturation.

13. A process as set forth in claim 12 wherein the limit of saturation in each absorption step is within the range of 60% to 70% saturation.

14. A process as set forth in claim 12 wherein the temperature of the palladium is maintained at 210° C. to 230° C.

15. A process as set forth in claim 12 wherein the absorption pressure exceeds the desorption pressure by 8 to 15 atmospheres of hydrogen partial pressure.

16. A process as set forth in claim 12 wherein the particulate palladium is in the form of palladium-containing coatings on inert particles.

17. A process as set forth in claim 12 wherein the particulate palladium is alloyed with at least one other metal.

References Cited

UNITED STATES PATENTS

| 3,398,504 | 8/1968 | Rubin | 55—16 |
| 3,405,510 | 10/1968 | Seal | 55—158 |
| 3,406,496 | 10/1968 | Betteridge et al. | 55—58 |

REUBEN FRIEDMAN, Primary Examiner

C. N. HART, Assistant Examiner

U.S. Cl. X.R.

55—58

PO-1050
(5/69)

UNITED STATES PATENT OFFICE
CERTIFICATE OF CORRECTION

Patent No. 3,494,100    Dated Feb. 10, 1970

Inventor(s) JAMES HOPE

It is certified that error appears in the above-identified patent and that said Letters Patent are hereby corrected as shown below:

Column 3, line 2, for "graped" read --graphed--; line 32, for "sauraed" read --saturated--; line 36, for "(cc.$H_2$/gm.-Pd/sec.)" read --(cc-$H_2$/gm.-Pd/sec.)--; line 41, for "elevaed" read --elevated--.

Column 6, line 6, for "viz" read --viz.--; line 31, remove TABLE III from this line and transfer to line 24 as heading for Table; and line 61, for "cc.-$H_2$/gm.Pd/sec." read --cc-$H_2$/gm.-Pd/sec.--.

Column 9, line 7, for "adsorption" read --absorption--; and line 10, for "Aproces s" read --A process--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents